(12) United States Patent
Ren et al.

(10) Patent No.: US 8,866,398 B2
(45) Date of Patent: Oct. 21, 2014

(54) CIRCUITS AND METHODS FOR DRIVING LIGHT SOURCES

(75) Inventors: Zhimou Ren, Chengdu (CN); Yunning Xie, Chengdu (CN); Jun Ren, Chengdu (CN); Ching-Chuan Kuo, Taipei (TW)

(73) Assignee: O2Micro, Inc., Santa Clara, CA (US)

( * ) Notice: Subject to any disclaimer, the term of this patent is extended or adjusted under 35 U.S.C. 154(b) by 205 days.

(21) Appl. No.: 13/608,273

(22) Filed: Sep. 10, 2012

(65) Prior Publication Data

US 2013/0300307 A1 Nov. 14, 2013

(30) Foreign Application Priority Data

May 11, 2012 (CN) .......................... 2012 1 0148065

(51) Int. Cl.
*H05B 37/02* (2006.01)

(52) U.S. Cl.
USPC .......................... 315/219; 315/307; 363/21.12

(58) Field of Classification Search
USPC ............... 315/219, 210, 307, 287; 363/21.12, 363/21.04
See application file for complete search history.

(56) References Cited

U.S. PATENT DOCUMENTS

| | | | |
|---|---|---|---|
| 5,691,605 A | 11/1997 | Xia et al. | |
| 5,959,443 A | 9/1999 | Littlefield | |
| 6,304,464 B1 | 10/2001 | Jacobs et al. | |
| 6,320,330 B1 | 11/2001 | Haavisto et al. | |
| 6,727,662 B2 | 4/2004 | Konopka et al. | |
| 6,839,247 B1 | 1/2005 | Yang et al. | |
| 6,946,819 B2 | 9/2005 | Fagnani et al. | |
| 6,975,078 B2 | 12/2005 | Yanai et al. | |
| 6,984,963 B2 | 1/2006 | Pidutti et al. | |
| 7,084,582 B2 | 8/2006 | Buonocunto | |
| 7,141,940 B2 | 11/2006 | Ortiz | |
| 7,148,664 B2 | 12/2006 | Takahashi et al. | |
| 7,180,274 B2 | 2/2007 | Chen et al. | |
| 7,190,124 B2 | 3/2007 | Kumar et al. | |
| 7,259,527 B2 | 8/2007 | Foo | |
| 7,288,902 B1 | 10/2007 | Melanson | |
| 7,304,464 B2 | 12/2007 | Weng et al. | |
| 7,307,614 B2 | 12/2007 | Vinn | |

(Continued)

FOREIGN PATENT DOCUMENTS

| | | | |
|---|---|---|---|
| CN | 1498055 A | 5/2004 | |
| CN | 1694597 A | 11/2005 | |

(Continued)

OTHER PUBLICATIONS

European search report dated Oct. 4, 2013 issued in European Patent Application No. 12161538.9 (9 pages).

(Continued)

*Primary Examiner* — Daniel D Chang

(57) ABSTRACT

A controller for controlling a power converter includes a signal generator and a driver. The power converter receives an input voltage and provides an output voltage to power a load. The signal generator receives a sense signal indicating a current flowing through the power converter, receives a detection signal indicating whether the power converter operates in a predetermined state, and generates a square wave signal according to the sense signal and the detection signal. The square wave signal has a first voltage level proportional to a peak level of the current when the power converter operates in the predetermined state; otherwise, the square wave signal has a second voltage level. The driver generates a driving signal based on the square wave signal to control a current flowing through the load.

20 Claims, 6 Drawing Sheets

(56) References Cited

U.S. PATENT DOCUMENTS

| | | |
|---|---|---|
| 7,312,783 B2 | 12/2007 | Oyama |
| 7,323,828 B2 | 1/2008 | Russell et al. |
| 7,466,082 B1 | 12/2008 | Snyder et al. |
| 7,639,517 B2 | 12/2009 | Zhou et al. |
| 7,649,325 B2 | 1/2010 | McIntosh et al. |
| 7,710,084 B1 | 5/2010 | Guo |
| 7,714,464 B2 | 5/2010 | Tsai et al. |
| 7,759,881 B1 | 7/2010 | Melanson |
| 7,800,315 B2 | 9/2010 | Shteynberg et al. |
| 7,804,256 B2 | 9/2010 | Melanson |
| 7,852,017 B1 | 12/2010 | Melanson |
| 7,863,828 B2 | 1/2011 | Melanson |
| 7,888,922 B2 | 2/2011 | Melanson |
| 7,944,153 B2 | 5/2011 | Greenfeld |
| 8,076,867 B2 | 12/2011 | Kuo et al. |
| 8,085,005 B2 | 12/2011 | Dearn |
| 8,232,780 B2 | 7/2012 | Uno |
| 8,233,292 B2 * | 7/2012 | Ren et al. .................. 363/21.12 |
| 8,274,800 B2 | 9/2012 | Uno et al. |
| 8,339,063 B2 | 12/2012 | Yan et al. |
| 8,344,657 B2 | 1/2013 | Zhan et al. |
| 8,379,413 B2 * | 2/2013 | Ren et al. .................. 363/21.12 |
| 2001/0005319 A1 | 6/2001 | Ohishi et al. |
| 2003/0048632 A1 | 3/2003 | Archer |
| 2004/0085030 A1 | 5/2004 | Laflamme et al. |
| 2004/0130271 A1 | 7/2004 | Sekoguchi et al. |
| 2005/0017691 A1 | 1/2005 | Aradachi et al. |
| 2006/0072324 A1 | 4/2006 | Hachiya et al. |
| 2006/0139907 A1 | 6/2006 | Yen |
| 2007/0047276 A1 | 3/2007 | Lin et al. |
| 2007/0182347 A1 | 8/2007 | Shteynberg et al. |
| 2007/0210725 A1 | 9/2007 | Marosek |
| 2007/0262724 A1 | 11/2007 | Mednik et al. |
| 2008/0030153 A1 | 2/2008 | Mizuno |
| 2008/0180075 A1 | 7/2008 | Xie et al. |
| 2008/0203946 A1 | 8/2008 | Ito et al. |
| 2008/0224631 A1 | 9/2008 | Melanson |
| 2008/0258641 A1 | 10/2008 | Nakagawa et al. |
| 2008/0258647 A1 | 10/2008 | Scianna |
| 2008/0259655 A1 * | 10/2008 | Wei et al. .................. 363/21.18 |
| 2008/0278092 A1 | 11/2008 | Lys et al. |
| 2008/0297068 A1 | 12/2008 | Koren et al. |
| 2009/0167187 A1 | 7/2009 | Kitagawa et al. |
| 2009/0184662 A1 | 7/2009 | Given et al. |
| 2009/0189548 A1 | 7/2009 | Hoffman et al. |
| 2009/0195180 A1 | 8/2009 | Chenetz |
| 2009/0224686 A1 | 9/2009 | Kunimatsu |
| 2009/0251059 A1 | 10/2009 | Veltman |
| 2009/0251071 A1 | 10/2009 | Gater et al. |
| 2009/0295303 A1 | 12/2009 | Pucko et al. |
| 2009/0309501 A1 | 12/2009 | Catalano et al. |
| 2009/0322254 A1 | 12/2009 | Lin |
| 2009/0322255 A1 | 12/2009 | Lin |
| 2010/0007292 A1 | 1/2010 | Horino |
| 2010/0013409 A1 | 1/2010 | Quek et al. |
| 2010/0026191 A1 | 2/2010 | Radermacher et al. |
| 2010/0141177 A1 | 6/2010 | Negrete et al. |
| 2010/0148681 A1 | 6/2010 | Kuo et al. |
| 2010/0219766 A1 | 9/2010 | Kuo et al. |
| 2010/0308733 A1 | 12/2010 | Shao |
| 2011/0001766 A1 | 1/2011 | Hua et al. |
| 2011/0013437 A1 | 1/2011 | Uruno et al. |
| 2011/0037399 A1 * | 2/2011 | Hung et al. .................. 315/219 |
| 2011/0050185 A1 | 3/2011 | Notman et al. |
| 2011/0115407 A1 | 5/2011 | Wibben et al. |
| 2011/0128303 A1 | 6/2011 | Yonemaru et al. |
| 2011/0133665 A1 | 6/2011 | Huang |
| 2011/0140620 A1 | 6/2011 | Lin et al. |
| 2011/0140630 A1 | 6/2011 | Doudousakis et al. |
| 2011/0227506 A1 | 9/2011 | Ren et al. |
| 2011/0285307 A1 | 11/2011 | Kimura et al. |
| 2011/0298374 A1 | 12/2011 | Lenk et al. |
| 2012/0081018 A1 | 4/2012 | Shteynberg et al. |
| 2012/0081029 A1 | 4/2012 | Choi et al. |
| 2012/0139433 A1 | 6/2012 | Yan et al. |
| 2012/0146532 A1 | 6/2012 | Ivey et al. |
| 2012/0217894 A1 | 8/2012 | Chang et al. |
| 2012/0242247 A1 | 9/2012 | Hartmann et al. |
| 2012/0262079 A1 | 10/2012 | Lin et al. |
| 2012/0268023 A1 | 10/2012 | Yan et al. |
| 2012/0293087 A1 | 11/2012 | Matsuda et al. |
| 2013/0033197 A1 | 2/2013 | Hwang et al. |
| 2013/0043801 A1 | 2/2013 | Kuwu |
| 2013/0147379 A1 * | 6/2013 | Zhou et al. .................. 315/210 |

FOREIGN PATENT DOCUMENTS

| | | |
|---|---|---|
| CN | 1760721 A | 4/2006 |
| CN | 101176386 A | 5/2008 |
| CN | 101179879 A | 5/2008 |
| CN | 101193486 A | 6/2008 |
| CN | 101222800 A | 7/2008 |
| CN | 101242143 A | 8/2008 |
| CN | 101370335 A | 2/2009 |
| CN | 101378207 A | 3/2009 |
| CN | 101466186 A | 6/2009 |
| CN | 101472368 A | 7/2009 |
| CN | 101489335 A | 7/2009 |
| CN | 101500354 A | 8/2009 |
| CN | 101511136 A | 8/2009 |
| CN | 101572974 A | 11/2009 |
| CN | 101605413 A | 12/2009 |
| CN | 101605416 A | 12/2009 |
| CN | 201491339 U | 5/2010 |
| CN | 101742771 A | 6/2010 |
| CN | 101801129 A | 8/2010 |
| CN | 101815383 A | 8/2010 |
| CN | 101854759 A | 10/2010 |
| CN | 201611973 U | 10/2010 |
| CN | 201682668 U | 12/2010 |
| CN | 101998726 A | 3/2011 |
| CN | 102014540 A | 4/2011 |
| CN | 102056378 A | 5/2011 |
| CN | 102118906 A | 7/2011 |
| CN | 202050564 U | 11/2011 |
| CN | 102438377 A | 5/2012 |
| DE | 29904988 U1 | 6/1999 |
| EP | 1565042 A2 | 8/2005 |
| EP | 2026634 A1 | 2/2009 |
| EP | 2031942 A2 | 3/2009 |
| EP | 2214457 A1 | 8/2010 |
| EP | 2273851 A2 | 1/2011 |
| EP | 2320710 A1 | 5/2011 |
| EP | 2533606 A1 | 12/2012 |
| GB | 2482371 A | 2/2012 |
| JP | 10070846 A | 3/1998 |
| JP | 2001185371 A | 7/2001 |
| JP | 2001245436 A | 9/2001 |
| JP | 2008210536 A | 9/2008 |
| JP | 2010140823 A | 6/2010 |
| JP | 2010140824 A | 6/2010 |
| JP | 2010282757 A | 12/2010 |
| JP | 2011009701 A | 1/2011 |
| WO | 2006006085 A1 | 1/2006 |
| WO | 2008001246 A1 | 1/2008 |
| WO | 2010148329 A1 | 12/2010 |
| WO | 2011048214 A1 | 4/2011 |

OTHER PUBLICATIONS

Japanese Office Action dated Oct. 15, 2013 issued in Japanese Patent Application 2010-258837 (3 pages).

The datasheet describes an Universal High Brightness LED driver HV9910B from Supertex Inc.

The datasheet describes a PWM high efficiency LED driver controller A704 from ADDtek Corp., Aug. 2008.

(56) References Cited

OTHER PUBLICATIONS

European Search Report dated Dec. 11, 2013 issued in related patent Application No. 13150915.0 (5 pages).

GB Office Action dated Jan. 14, 2013 issued in related GB patent Application No. 1313787.2 (5 pages).

Datasheet of "Close Loop LED Driver with Enhanced PWM Dimming" from Supertex Inc, Dec. 31, 2009, pp. 1-12, XP002714011, CA, 94089, US.

Application report of "Driving High-Current LEDs" from Texas Instrument, Jan. 31, 2007, pp. 1-8, XP002714012.

Combined Search and Examination Report dated Jun. 26, 2014 issued for British Patent Application No. 1405042.1.

* cited by examiner

CIRCUITS AND METHODS FOR DRIVING LIGHT SOURCES

RELATED APPLICATION

This application claims priority to Chinese Patent Application No. 201210148065.1, filed on May 11, 2012, with the State Intellectual Property Office of the People's Republic of China, which is hereby incorporated by reference in its entirety.

BACKGROUND

A light source such as a light-emitting diode (LED) light source is widely used in the lighting industry, for example as a backlight of a liquid crystal display (LCD), for street lighting, and in household appliances. A direct current (DC) light source is driven by an output voltage generated by a DC power source. If an alternating current (AC) power source is used to provide power, a converter converts an AC voltage generated by the AC power source to a DC voltage to power the light source.

In a conventional driving circuit, a current sensor, e.g., a resistor coupled to the light source, is coupled to an output of the converter for generating a sense signal indicating a current flowing through the light source. The driving circuit adjusts output power of the converter based on the sense signal to maintain the current through the light source within a target range. However, an input and an output of an isolated converter, e.g., a flyback converter, may have different reference grounds. Thus, an isolator, e.g., an optical coupler, is needed to transfer the sense signal generated at the output of the converter to the input of the converter. As such, the size and the cost of the driving circuit are increased.

SUMMARY

In one embodiment, a controller for controlling a power converter includes a signal generator and a driver. The power converter receives an input voltage and provides an output voltage to power a load. The signal generator receives a sense signal indicating a current flowing through the power converter, receives a detection signal indicating whether the power converter operates in a predetermined state, and generates a square wave signal according to the sense signal and the detection signal. The square wave signal has a first voltage level proportional to a peak level of the current when the power converter operates in the predetermined state; otherwise, the square wave signal has a second voltage level. The driver generates a driving signal based on the square wave signal to control a current flowing through the load.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention provide a controller for controlling a power converter (e.g., an isolated converter) that receives an input voltage and provides an output voltage to power a load. The controller includes a signal generator and a driver. Advantageously, the signal generator receives a sense signal indicating a current flowing through the power converter and a detection signal indicating whether said power converter operates in a predetermined state. For example, the power converter operates in the predetermined state when a current flowing through said power converter decreases. The signal generator is capable of generating a square wave signal. The square wave signal has a first voltage level proportional to a peak level of a current flowing through the power converter when said power converter operates in said predetermined state. The square wave signal has a second voltage level when the power converter operates in a state other than the predetermined state. The driver is capable of generating a driving signal based on the square wave signal to adjust the current flowing through the load to a target level. Since the current sensor at the output of the power converter and the isolator between the input and the output of the power converter are omitted, the size and the cost of the driving circuit are reduced.

Figure 1:
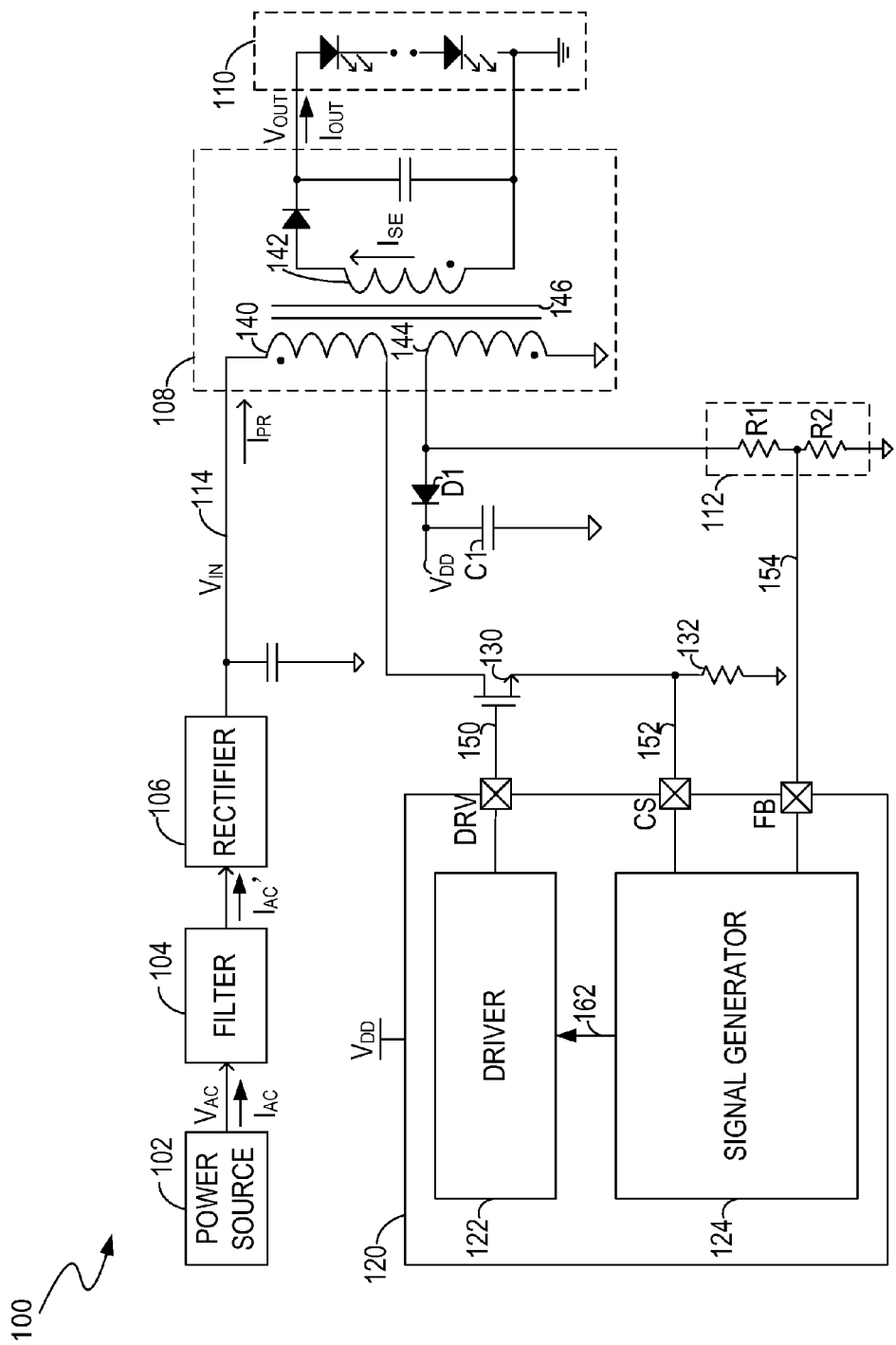
FIG. 1 illustrates a diagram of a driving circuit, in an embodiment according to the present invention.

FIG. 1 illustrates a diagram of a driving circuit 100, in an embodiment according to the present invention. In one embodiment, the driving circuit 100 includes a filter 104 coupled to a power source 102, a rectifier 106, a power converter 108, and a controller 120. The rectifier 106 can be, but is not limited to, a half-wave rectifier, a full-wave rectifier or a bridge rectifier. The power source 102 generates an alternating current (AC) input voltage $V_{AC}$, e.g., having a sinusoidal waveform, and an AC input current $I_{AC}$. The AC input current $I_{AC}$ flows to the filter 104. A current $I_{AC}'$ flows from the filter 104 to the rectifier 106. The rectifier 106 receives the AC input voltage $V_{AC}$, and provides a rectified voltage $V_{IN}$ and a rectified current $I_{PR}$ on a power line 114 coupled between the rectifier 106 and the power converter 108. The power converter 108 converts the rectified voltage $V_{IN}$ to an output voltage $V_{OUT}$ to power the load 110. In one embodiment, the load 110 is a light source, e.g., an LED light source. This invention is not so limited; the load 110 can include other types of light sources or other types of loads such as a battery pack. The controller 120 coupled to the power converter 108 controls the power converter 108 to adjust a current $I_{OUT}$ flowing through the load 110 and to correct a power factor of the driving circuit 100.

In one embodiment, the controller 120 includes multiple pins, such as a DRV pin, a CS pin, and an FB pin. The CS pin receives a sense signal 152 indicating a current flowing through the power converter 108. The FB pin receives a detection signal 154 indicating whether the power converter 108 operates in a predetermined state. The controller 120 generates a driving signal 150 according to the sense signal 152 and the detection signal 154 to control the power converter 108.

In one embodiment, the power converter 108 includes a primary winding 140, a secondary winding 142, an auxiliary winding 144, and a core 146. The primary winding 140 is coupled to a switch 130. The primary winding 140 receives the rectified voltage $V_{IN}$. The secondary winding 142 provides the output voltage $V_{OUT}$. The auxiliary winding 144 is coupled to a diode D1 and a capacitor C1, and provides a voltage $V_{DD}$ to power the controller 120. In one embodiment, the driving signal 150 is a pulse-width modulation (PWM) signal. The driving signal 150 controls the switch 130 to alternately operate in an ON state or an OFF state. More specifically, when the driving signal 150 has a first state, e.g., a high electrical level, the switch 130 operates in the ON state. Then, the power converter 108 is charged by the rectified voltage $V_{IN}$, and the current $I_{PR}$ through the primary winding 140 increases. Thus, the energy is stored from the rectifier 106 to the core 146. The current $I_{PR}$ can be given according to equation (1):

$$\Delta I_{PR} = V_{IN} * T_{ON}/L_{140}, \quad (1)$$

where $T_{ON}$ represents a time period when the switch 130 operates in the ON state, $\Delta I_{PR}$ represents an amount of change of the current $I_{PR}$, and $L_{104}$ represents the inductance of the filter 104. In one embodiment, the driving circuit 100 further includes a sense resistor 132 coupled to the primary winding 140. The sense resistor 132 generates the sense signal 152 indicating the current $I_{PR}$. For example, the sense signal 152 can be represented by a voltage on the sense resistor 132.

In addition, when the driving signal 150 is switched to a second state, e.g., a low electrical level, the switch 130 operates in the OFF state. Thus, the energy stored in the core 146 is transferred to the light source 110 through the secondary winding 142. Then, a current $I_{SE}$ flowing through the secondary winding 142 decreases. The current $I_{SE}$ can be given according to equation (2):

$$\Delta I_{SE} = (-V_{OUT}) * T_{DIS}/L_{142}, \quad (2)$$

where $T_{DIS}$ represents a time period when the current $I_{SE}$ decreases, $\Delta I_{SE}$ represents an amount of change of the current $I_{SE}$, and $L_{142}$ represents the inductance of the secondary winding 142. In one embodiment, the power converter 108 operates in the predetermined state when the current $I_{SE}$ is decreasing. In one embodiment, the current $I_{SE}$ stops decreasing when its current level reaches a predetermined level, e.g., zero ampere. As such, a time period $T_{OFF}$ when the switch 130 operates in the OFF state is greater than or equal to the time period $T_{DIS}$.

Figure 2:
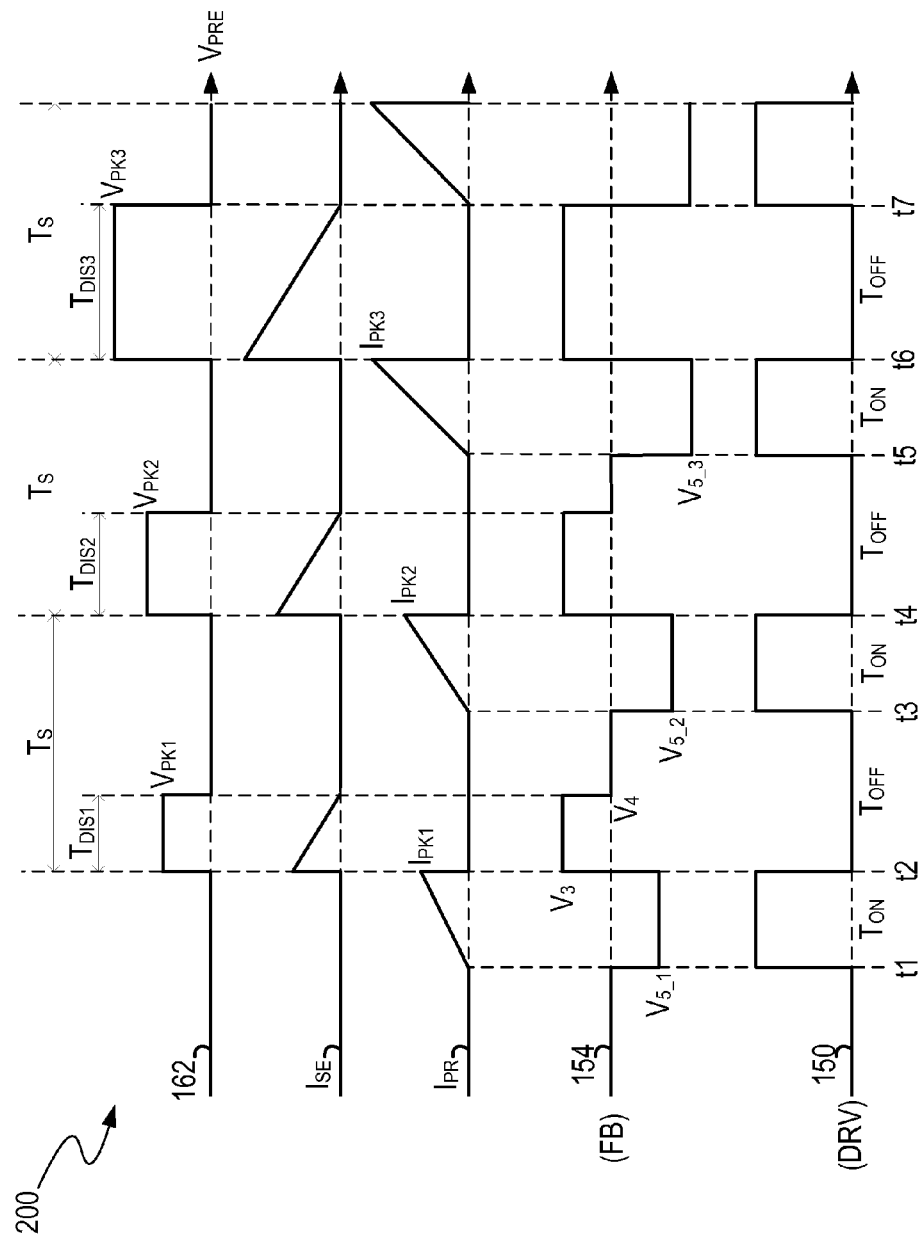
FIG. 2 illustrates a waveform of signals generated or received by a driving circuit, in an embodiment according to the present invention.

FIG. 2 illustrates a waveform of signals generated or received by a driving circuit, e.g., the driving circuit 100, in an embodiment according to the present invention. FIG. 2 is described in combination with FIG. 1. FIG. 2 shows a square wave signal 162, the current $I_{SE}$ through the secondary winding 142, the current $I_{PR}$ through the primary winding 140, the detection signal 154, and the driving signal 150.

In the example of FIG. 2, the driving signal 150 is a pulse width modulation (PWM) signal. During the time periods of t1 to t2, t3 to t4, and t5 to t6 (represented as $T_{ON}$), the driving signal has a first state, e.g., a high electrical level. Thus, the switch 130 is turned on. During the time periods of t2 to t3, t4 to t5, and t6 to t7 (represented as $T_{OFF}$), the driving signal 150 has a second state, e.g., a low electrical level. Thus, the switch 130 is turned off. $T_S$ represents a cycle period of the driving signal 150. This represents the time period when the current $I_{SE}$ through the secondary winding 142 decreases.

Referring to FIG. 1, the driving circuit 100 further includes a voltage divider 112 coupled to the auxiliary winding 144, in one embodiment. The voltage divider 112 provides the detection signal 154. More specifically, when the switch 130 is turned off and when the current $I_{SE}$ decreases, e.g., during $T_{DIS1}$, $T_{DIS2}$ or $T_{DIS3}$, a voltage on the auxiliary winding 144 has a positive level. Thus, the detection signal 154 has a positive level $V_3$ indicating that the power converter 108 is operating in the predetermined state. When the current $I_{SE}$ decreases to zero ampere, the voltage on the auxiliary winding 144 drops to zero volts. Thus, as shown in FIG. 2, the detection signal 154 has a voltage level $V_4$, e.g., equal to zero volts. When the switch 130 is turned on, e.g., during $T_{ON}$, the current $I_{PR}$ increases, and the voltage on the auxiliary winding 144 has a negative level. Thus, the detection signal 154 has a negative voltage level $V_5$, e.g., negative levels $V_{5\_1}$, $V_{5\_2}$ or $V_{5\_3}$. When the detection signal 154 has the level $V_4$ or $V_5$, the power converter 108 does not operate in the predetermined state.

The controller 120 includes a signal generator 124 and a driver 122. The signal generator 124 coupled to the CS pin and the FB pin receives the sense signal 152 and the detection signal 154. The signal generator 124 generates a square wave signal 162 according to the sense signal 152 and the detection signal 154. The driver 122 generates the driving signal 150 at the DRV pin according to the square wave signal 162 to control the switch 130. Advantageously, during the time period $T_{DIS}$, the detection signal 154 has the voltage level $V_3$ indicating that the power converter 108 operates in the predetermined state. The square wave signal 162 has a voltage level $V_{PK}$, e.g., $V_{PK1}$, $V_{PK2}$ or $V_{PK3}$, which is proportional to a peak level $I_{PK}$ of the current $I_{PR}$, e.g., $I_{PK1}$, $I_{PK2}$ or $I_{PK3}$. The voltage level $V_{PK}$ can be given according to equation (3):

$$V_{PK} = A * I_{PK}, \quad (3)$$

where A represents a proportional coefficient between the voltage level $V_{PK}$ and the current level $I_{PK}$. In the example of FIG. 1, A is proportional to the resistance of the resistor 132. During the time period other than $T_{DIS}$, the detection signal 154 has the voltage level $V_4$ or $V_5$ indicating that the power converter 108 does not operate in the predetermined state. Therefore, the square wave signal 162 is switched to the voltage level $V_{PRE}$, e.g., zero volts.

As shown in FIG. 1, an average current $I_{SE\_AVG}$ through the secondary winding 142 during the time period $T_{DIS}$ is proportional to an average current $I_{PR\_AVG}$ through the primary winding 140 during the time period $T_{ON}$, and can be given according to equation (4):

$$I_{SE\_AVG} = I_{PR\_AVG} * (N_{PR}/N_{SE})) = \frac{1}{2} * I_{PK} * (N_{PR}/N_{SE}), \quad (4)$$

where $N_{PR}/N_{SE}$ represents a turn ratio between the primary winding 140 and the secondary winding 142. Based on the waveforms 200 in FIG. 2, an average value $V_{SQ\_AVG}$ of the square wave signal 162 can be represented as equation (5):

$$V_{SQ\_AVG}=V_{PK}*(T_{DIS}/T_S). \quad (5)$$

As such, according to equations (3), (4) and (5), the average value $V_{SQ\_AVG}$ can be further represented as equation (6):

$$V_{SQ\_AVG}=(2*A*(T_{DIS}/T_S)/(N_{PR}/N_{SE}))*I_{SE\_AVG}. \quad (6)$$

Since an average level $I_{OUT\_AVG}$ of the output current $I_{OUT}$ is equal to the average value $I_{SE\_AVG}$ of current $I_{SE}$ during a cycle period $T_S$, e.g., $I_{SE\_AVG}*(T_{DIS}/T_S)=I_{OUT\_AVG}$, the average value $V_{SQ\_AVG}$ of the square wave signal 162 can be given by equation (7):

$$V_{SQ\_AVG}=(2*A/(N_{PR}/N_{SE}))*I_{OUT\_AVG}. \quad (7)$$

According to equation (7), the average value $V_{SQ\_AVG}$ of the square wave signal 162 is proportional to the average level $I_{OUT\_AVG}$. The driver 122 can adjust the average current $I_{OUT\_AVG}$ to a predetermined target level via the driving signal 150. Advantageously, both the current sensor (which is at the output of the power converter) and the isolator can be removed from the driving circuit 100, thereby reducing the size and the cost of the driving circuit 100.

Figure 3:
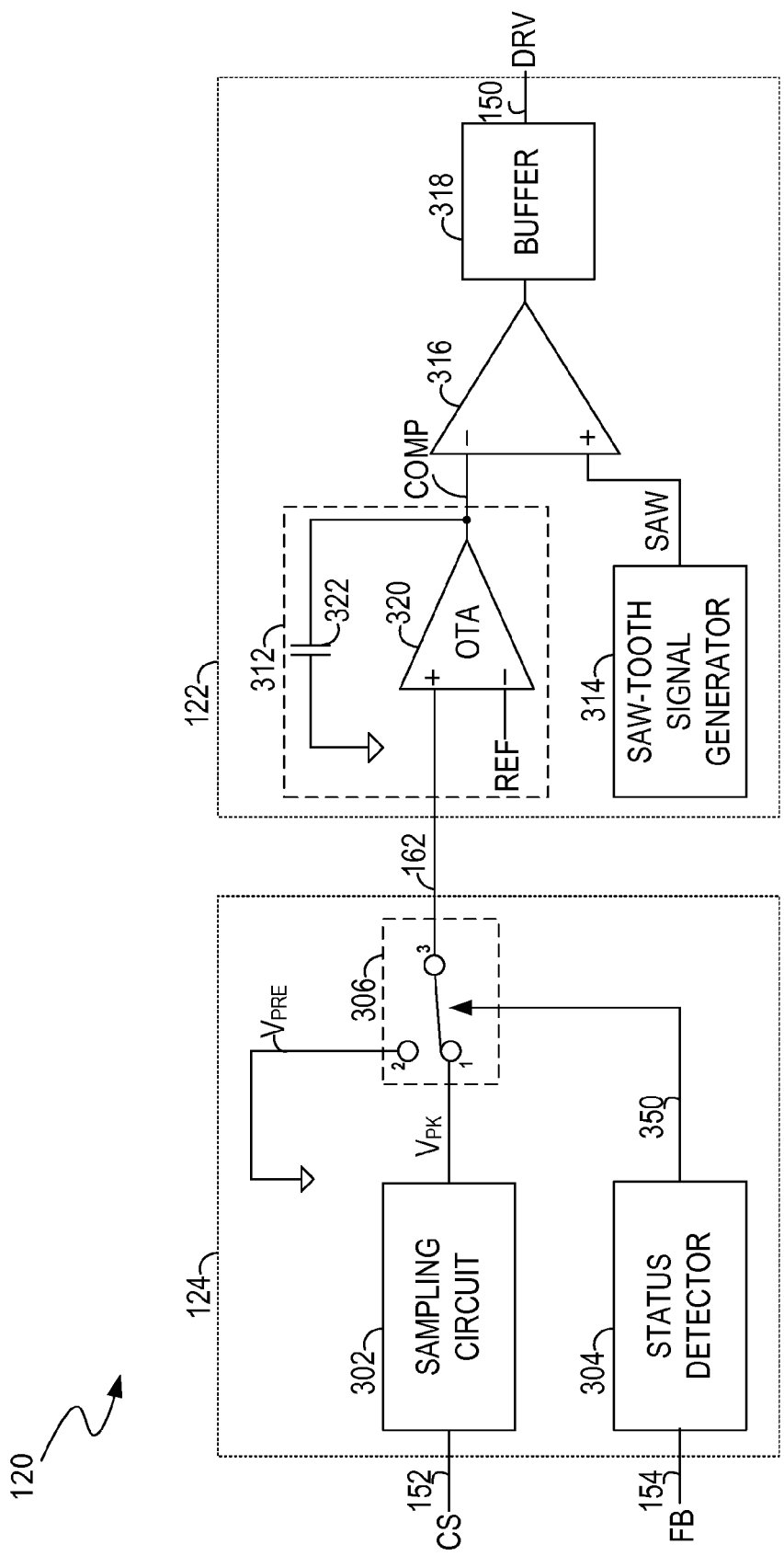
FIG. 3 illustrates an example of a block diagram of a controller, in an embodiment according to the present invention.

FIG. 3 illustrates an example of a diagram of the controller 120 in FIG. 1, in an embodiment according to the present invention. Elements labeled the same as in FIG. 1 have similar functions. FIG. 3 is described in combination with FIG. 1 and FIG. 2. In the example of FIG. 3, the controller 120 includes a signal generator 124 and a driver 122.

In one embodiment, the signal generator 124 includes a sampling circuit 302, a status detector 304, and a switch 306. The sampling circuit 302 is coupled to the CS pin to receive the sense signal 152. The sampling circuit 302 samples the peak level $I_{PK}$ of the current $I_{PR}$ according to the sense signal 152. In one embodiment, the sampling circuit 302 operates as a sample and hold circuit. Specifically, the sampling circuit 302 samples levels of the current $I_{PR}$ and holds the peak level $I_{PK}$ of the current $I_{PR}$. Thus, the sampling circuit 302 outputs a peak signal $V_{PK}$ proportional to the peak level $I_{PK}$. In one embodiment, when the current $I_{PR}$ has a peak level $I_{PK1}$ at a first time, the peak signal $V_{PK}$ is maintained at a voltage level $V_{PK1}$ proportional to $I_{PK1}$ until the next peak level of the current $I_{PR}$ presents at a second time.

In one embodiment, the switch 306 has a first terminal, a second terminal, and a third terminal. The first terminal of the switch 306 is coupled to the output of the sampling circuit 302 to receive the peak signal $V_{PK}$. The second terminal of the switch 306 is coupled to ground to receive a predetermined voltage signal $V_{PRE}$, e.g., $V_{PRE}$ is equal to zero volts. The third terminal of the switch 306 is coupled to an input of the driver 122 to provide the square wave signal 162. However, the second terminal of switch 306 may be coupled to a signal generator that provides a predetermined constant voltage to the second terminal.

The status detector 304 is coupled to the FB pin of the controller 120 to receive the detection signal 154. The status detector 304 determines whether the power converter 108 is in the predetermined state according to the detection signal 154, and generates the switch control signal 350 to control the switch 306. In one embodiment, when the detection signal 154 has a voltage level $V_3$, which indicates that the power converter 108 is operating in the predetermined state, the switch control signal 350 has a first state, e.g., a high electrical level. Then, the first terminal of switch 306 is coupled to the third terminal. Thus, the square wave signal 162 is equal to the peak signal $V_{PK}$. When the detection signal 154 has the voltage level $V_4$ or $V_5$, which indicates that the power converter 108 operates in a state other than the predetermined state, the switch control signal 350 has a second state, e.g., a low electrical level. Then, the second terminal of the switch 306 is coupled to the third terminal. As such, the square wave signal 162 is equal to the predetermined voltage level $V_{PRE}$. The operation of the signal generator 124 is further described in FIG. 3.

In one embodiment, the driver 122 includes an operational amplifier 312, a saw-tooth signal generator 314, a comparator 316, and a buffer 318. In one embodiment, the operational amplifier 312 includes an operational transconductance amplifier (OTA) 320 and a capacitor 322. The OTA 320 includes an input for receiving the square wave signal 162, and includes another input for receiving a reference signal REF. The reference signal REF indicates a target current level for the current $I_{OUT}$ flowing through the light source 110. Based on a comparison between the square wave signal 162 and the reference signal REF, the OTA 320 generates a current that charges or discharges the capacitor 322. As such, an error signal COMP is generated. Since the capacitor 322 filters noises and ripples of the error signal COMP, the error signal COMP is determined by a difference between the average value $V_{SQ\_AVG}$ of the square wave signal 162 and the reference signal REF. In another embodiment, the capacitor 322 is outside the controller 120, and is coupled to the OTA 320 through a pin of the controller 120.

The saw-tooth signal generator 314 generates a saw-tooth signal SAW. The comparator 316 compares the error signal COMP and the saw-tooth signal SAW, and generates a comparison signal. The buffer 318 receives the comparison signal and generates the driving signal 150, e.g., a PWM signal. In the example of FIG. 3, if the average value $V_{SQ\_AVG}$ increases, then the error signal COMP increases. As such, the saw-tooth signal SAW needs more time to increase to the error signal COMP. Thus, the duty cycle of the driving signal 150 decreases. Similarly, if the average value $V_{SQ\_AVG}$ decreases, the duty cycle of the driving signal 150 increases.

Referring to both FIG. 1 and FIG. 3, the controller 120 and the power converter 108 constitute a negative feedback loop. More specifically, in one embodiment, the duty cycle of the driving signal 150 determines the average level $I_{OUT\_AVG}$ of the output current $I_{OUT}$. According to the equation (7), the average value $V_{SQ\_AVG}$ is proportional to the average level $I_{OUT\_AVG}$. Furthermore, the average value $V_{SQ\_AVG}$ determines the duty cycle of the driving signal 150. As such, the negative feedback loop (including the controller 120 and the power converter 108) maintains the average value $V_{SQ\_AVG}$ to be equal to the reference signal REF, thereby adjusting the average current $I_{OUT\_AVG}$ to a target level $I_{TARGET}$ indicated by the reference signal REF.

For example, if the average value $V_{SQ\_AVG}$ is greater than the reference signal REF, which indicates that the average current $I_{OUT\_AVG}$ is greater than the target level $I_{TARGET}$, the operational amplifier 312 increases the error signal COMP to decrease the duty cycle of the driving signal 150. As such, the average current $I_{OUT\_AVG}$ decreases until the average value $V_{SQ\_AVG}$ becomes equal to the reference signal REF. Similarly, if the average value $V_{SQ\_AVG}$ is less than the reference signal REF, which indicates that the average current $I_{OUT\_AVG}$ is less than the target level $I_{TARGET}$, the operational amplifier 312 decreases the error signal COMP to increase the duty cycle of the driving signal 150. As such, the average current $I_{OUT\_AVG}$ increases until the average value $V_{SQ\_AVG}$ becomes equal to the reference signal REF. In this way, the average level of the output current $I_{OUT}$ can be maintained at the target level $I_{TARGET}$, which improves the accuracy of the output control of the driving circuit 100. The controller 120 can have other configurations and is not limited to the example in FIG. 3.

Figure 4:
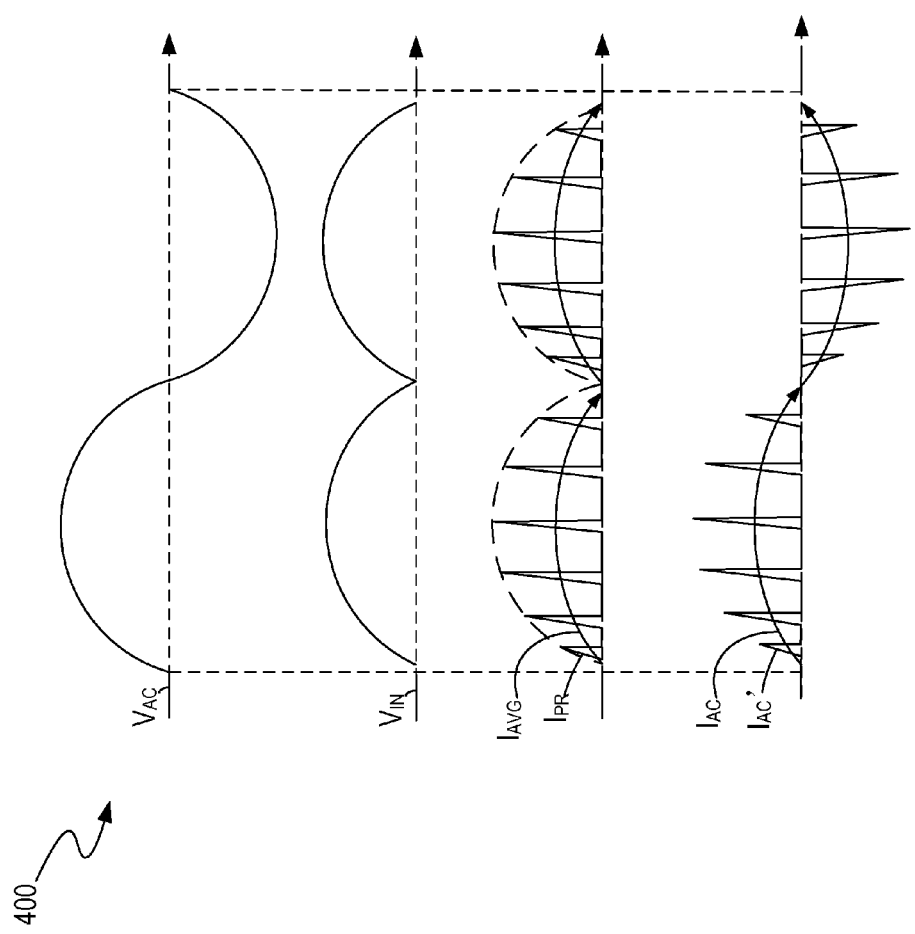
FIG. 4 illustrates an example of waveforms of signals associated with a driving circuit, in an embodiment according to the present invention.

FIG. 4 illustrates an example of waveforms 400 of signals associated with a driving circuit, e.g., the driving circuit 100, in an embodiment according to the present invention. FIG. 4 is described in combination with FIG. 1, FIG. 2 and FIG. 3. FIG. 4 shows the input AC voltage $V_{AC}$, the rectified voltage $V_{IN}$, the rectified current $I_{PR}$, an average current $I_{AVG}$ of the rectified current $I_{PR}$, the current $I_{AC}'$, and the input AC current $I_{AC}$.

For illustrative purposes and not limitation, the input AC voltage $V_{AC}$ has a sinusoidal waveform, and the rectifier 106 is assumed to be a bridge rectifier. The rectifier 106 rectifies the input AC voltage $V_{AC}$. In the example of FIG. 4, the rectified AC voltage $V_{IN}$ has a rectified sinusoidal waveform, in which positive waves of the input AC voltage $V_{AC}$ remain and negative waves of the input AC voltage $V_{AC}$ are converted to corresponding positive waves.

In one embodiment, the driving signal 150 generated by the controller 120 controls the rectified current $I_{PR}$. As described in relation to FIG. 3, if the average output current $I_{OUT\_AVG}$ is maintained at the target current level, the duty cycle of the driving signal 150 remains the same. Thus, the time period $T_{ON}$ when the switch 130 is turned on remains constant. According to FIG. 2 and equation (1), the rectified current $I_{PR}$ is increased from a predetermined level, e.g., zero amperes. When the rectified current $I_{PR}$ reaches a level which is proportional to the rectified voltage $V_{IN}$, the rectified current $I_{PR}$ is decreased to the predetermined level. Thus, the waveform of the average current $I_{AVG}$ of the rectified current $I_{PR}$ is substantially in phase with the waveform of the rectified voltage $V_{IN}$.

The rectified current $I_{PR}$ flowing from the rectifier 106 to the power converter 108 is a rectified current of the current $I_{AC}'$ flowing into the rectifier 106. As shown in FIG. 4, the current $I_{AC}'$ has positive waves similar to those of the current $I_{PR}$ when the input AC voltage $V_{AC}$ is positive and has negative waves corresponding to those of the current $I_{PR}$ when the input AC voltage $V_{AC}$ is negative.

In one embodiment, by employing the filter 104 between the power source 102 and the rectifier 106, the input AC current $I_{AC}$ is equal to or proportional to an average current of the current $I_{AC}'$. Therefore, as shown in FIG. 4, the waveform of the input AC current $I_{AC}$ is substantially in phase with the waveform of the input AC voltage $V_{AC}$. Ideally, the input AC current $I_{AC}$ is in phase with the input AC voltage $V_{AC}$. However, in practical applications, there are capacitors in the filter 104 and the power converter 108. Thus, the input AC current $I_{AC}$ and the input AC voltage $V_{AC}$ can have a slight phase difference. Moreover, the shape of the waveform of the input AC current $I_{AC}$ is similar to the shape of the waveform of the input AC voltage $V_{AC}$. Thus, the power factor of the driving circuit 100 is corrected, which improves the power quality of the driving circuit 100.

Figure 5:
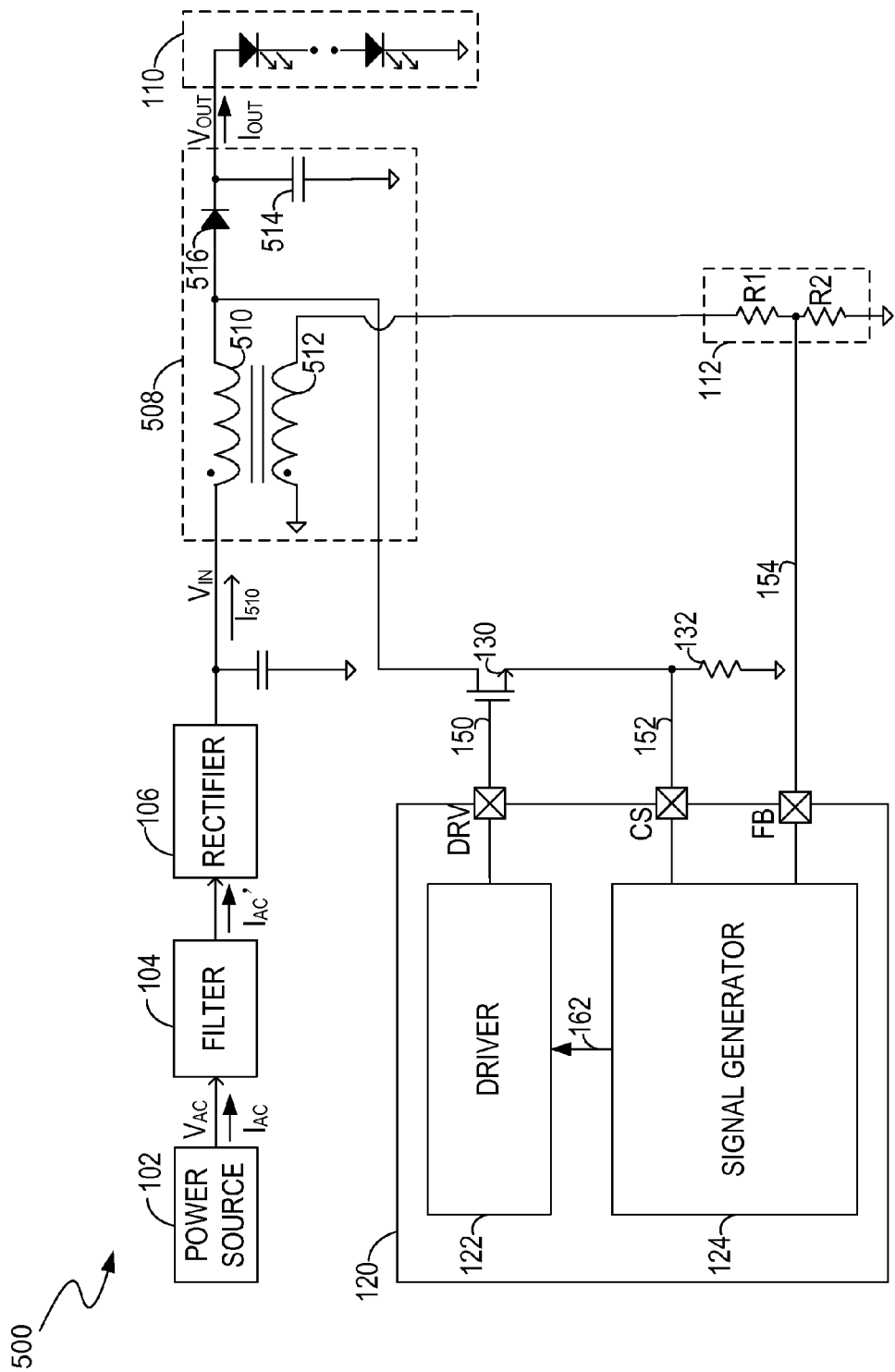
FIG. 5 illustrates another diagram of a driving circuit, in an embodiment according to the present invention.

FIG. 5 illustrates another diagram of a driving circuit 500, in an embodiment according to the present invention. Elements labeled the same as in FIG. 1 have similar functions. FIG. 5 is described in combination with FIG. 1 and FIG. 2.

In one embodiment, the driving circuit 500 includes a filter 104 coupled to the power source 102, a rectifier 106, a power converter 508, and a controller 120. The power converter 508 is a boost converter, which is different from the flyback converter 108 in the example of FIG. 1. The power converter 508 includes an inductor 510, an inductor 512, a capacitor 514, and a diode 516. Similar to the driving circuit 100, the driving signal 150 alternately operates the switch 130 in the ON state or the OFF state. When the switch 130 is turned on, the diode 516 is reverse-biased. Thus, a current $I_{510}$ flowing through the inductor 510, the switch 130 and the resistor 132 increases.

When the switch 130 is turned off, the diode 516 is forward-biased. Thus the current $I_{510}$ flowing through the inductor 510, the diode 516, and the light source 110 decreases.

The resistor 132 senses the current $I_{510}$ flowing through the inductor 510 when the switch 130 is turned on, and provides a sense signal 152. In an alternative embodiment, the resistor 132 is coupled to the inductor 510 in series between the rectifier 106 and the switch 130. In this case, the resistor 132 senses the current $I_{510}$ when the switch is turned on and off. The inductor 512 is magnetically coupled to the inductor 510 and generates the detection signal 154 indicating whether the converter 508 operates in a predetermined state, e.g., whether the current $I_{510}$ is decreasing. Similar to the auxiliary winding 144 in FIG. 1, when the switch 130 is turned off and when the current $I_{510}$ decreases, the detection signal 154 has a positive level $V_3$. When the switch 130 is turned off and after the current $I_{510}$ decreases to zero ampere, the detection signal 154 has a voltage level $V_4$, e.g., zero volts. When the switch 130 is turned on, the detection signal 154 a voltage level $V_5$, e.g., negative levels $V_{5\_1}$, $V_{5\_2}$ or $V_{5\_3}$. Thus, the signal generator 124 determines whether the current $I_{510}$ is decreasing according to the detection signal 154, and samples a peak level of the current $I_{510}$ according to the sense signal 152.

Advantageously, similar to FIG. 1, the signal generator 124 generates the square wave signal 162 according to the sense signal 152 and the detection signal 154. The driver 122 generates driving signal 150 according to the square wave signal 162 to control the switch 130. The average value $V_{SQ\_AVG}$ of the square wave signal 162 is proportional to the average level $I_{OUT\_AVG}$ of the output current $I_{OUT}$. Thus, the controller 120 controls the driving signal 150 according to the square wave signal 162, to adjust the average current $I_{OUT\_AVG}$ to the predetermined target level. The driving circuit can have other configurations and is not limited to the examples in FIG. 1 and FIG. 5.

Figure 6:
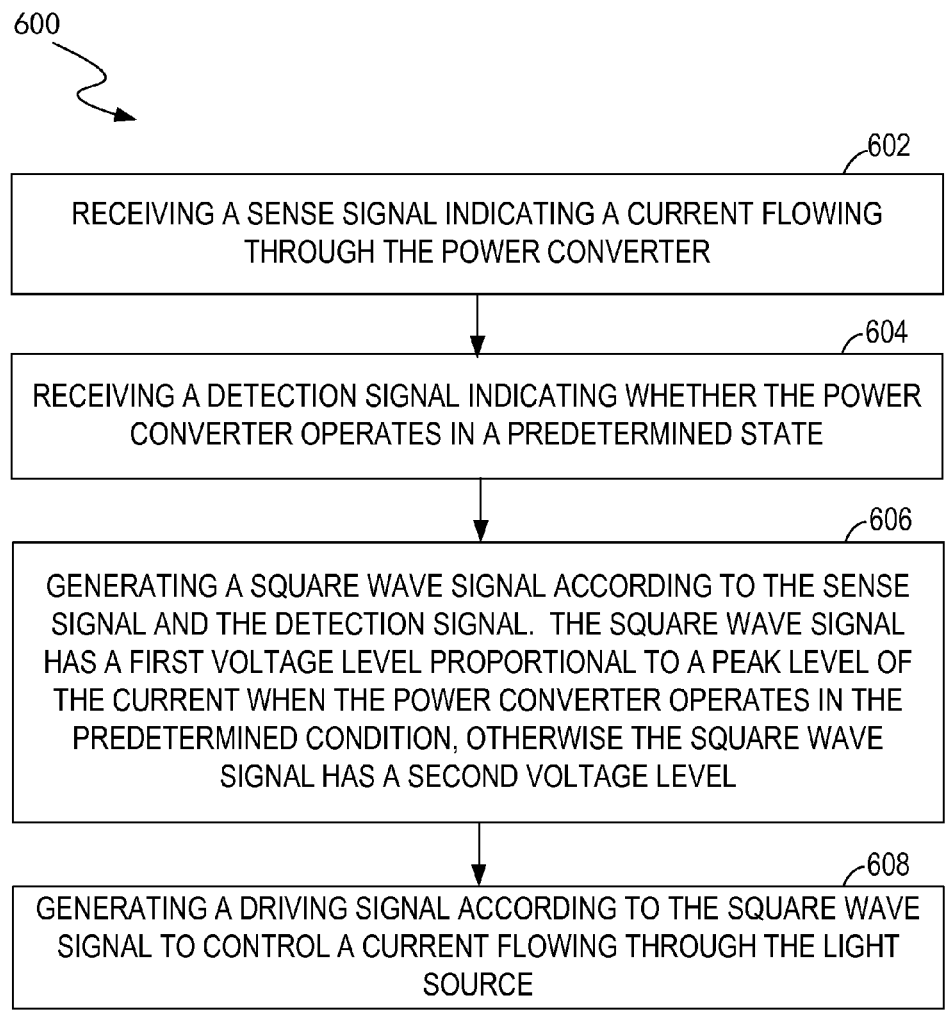
FIG. 6 illustrates a flowchart of operations performed by a driving circuit for driving a load, in an embodiment according to the present invention.

FIG. 6 illustrates a flowchart 600 of operations performed by a driving circuit for driving a load, e.g., the driving circuit 100 or 500 for driving the light source 110, in an embodiment according to the present invention. FIG. 6 is described in combination with FIG. 1-FIG. 5. Although specific steps are disclosed in FIG. 6, such steps are examples. That is, the present invention is well suited to performing various other steps or variations of the steps recited in FIG. 6.

In block 602, a sense signal, e.g., the sense signal 152, indicating a current flowing through a power converter, e.g., the power converter 108 or the power converter 508, is received. The power converter receives an input voltage and provides an output voltage to power a light source.

In block 604, a detection signal, e.g., the detection signal 154, indicating whether the power converter operates in a predetermined state, is received. In one embodiment, the power converter includes a primary winding, e.g., the primary winding 140, and a secondary winding, e.g., the secondary winding 142. The primary winding receives the input voltage. The secondary winding generates the output voltage. The sense signal is generated by sensing a current flowing through the primary winding. The detection signal is generated by detecting a status of the current flowing through the secondary winding. In another embodiment, the power converter includes an inductor, e.g., the inductor 510. The sense signal is generated by sensing a current flowing through the inductor. The detection signal is generated by detecting a status of the current flowing through the inductor.

In block 606, a square wave signal, e.g., the square wave signal 162, is generated according to the sense signal and the detection signal. When the power converter operates in the predetermined state, the square wave signal has a first voltage level, e.g., $V_{PK}$, which is proportional to a peak level of the current flowing through the power converter. Otherwise, the square wave signal has a second voltage level, e.g., $V_{PRE}$. In one embodiment, the peak level of the current through the power converter is detected according to the sense signal. A peak signal having the first voltage level is generated according to the peak level. When the power converter operates in the predetermined state, the peak signal is transferred to a driver. When the power converter operates in a state other than the predetermined state, a predetermined voltage signal having the second voltage level is transferred to the driver.

In block 608, a driving signal, e.g., the driving signal 150, is generated by the driver according to the square wave signal to control a current flowing through the light source, e.g., $I_{OUT}$. In one embodiment, a reference signal, e.g., the signal REF, indicating a target level of the current flowing through the light source, is received. An error signal, e.g., the signal COMP, is generated according to a difference between an average value of the square wave signal and the reference signal. The saw-tooth signal is compared with the error signal to generate the driving signal. In one embodiment, an average level of the current flowing through the light source is adjusted to the target level by maintaining the average value of the square wave signal to be equal to the reference signal. In one embodiment, the average value of the square wave signal is proportional to the average level of the current flowing through the light source.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller, comprising:
    a signal generator configured to receive a sense signal indicating a current flowing through a power converter that receives an input voltage and provides an output voltage to power a load, receive a detection signal indicating whether said power converter operates in a predetermined state, and generate a square wave signal according to said sense signal and said detection signal, wherein said square wave signal has a first voltage level proportional to a peak level of said current when said power converter operates in said predetermined state, and otherwise said square wave signal has a second voltage level; and
    a driver coupled to said signal generator and configured to generate a driving signal based on said square wave signal to control a current flowing through said load, wherein said signal generator comprises:
    a sampling circuit configured to detect said peak level of said current through said power converter according to said sense signal, and generate a peak signal having said first voltage level; and
    a switch coupled to said sampling circuit, wherein said switch transfers said peak signal to said driver when said power converter operates in said predetermined state; otherwise, said switch transfers a reference signal having said second voltage level to said driver.

2. The controller as claimed in claim 1, wherein said power converter comprises a primary winding and a secondary winding, wherein said primary winding receives said input voltage, and said secondary winding generates said output voltage, wherein said sense signal indicates a current flowing through said primary winding, and wherein said power converter operates in said predetermined state when a current flowing through said secondary winding decreases.

3. The controller as claimed in claim 1, wherein said power converter comprises an inductor, wherein said sense signal indicates a current flowing through said inductor, and wherein said power converter operates in said predetermined state when a current through said inductor decreases.

4. The controller as claimed in claim 1, wherein said driver comprises:
    an amplifier configured to receive said square wave signal and a reference signal, wherein said reference signal indicates a target level of said current flowing through said load, and wherein said amplifier generates an error signal according to a difference between an average level of said square wave signal and said reference signal; and
    a comparator coupled to said amplifier and configured to compare a saw-tooth signal with said error signal to generate said driving signal.

5. The controller as claimed in claim 4, wherein said controller and said power converter constitute a negative feedback loop, and wherein said negative feedback loop maintains said average level of said square wave signal to be equal to said reference signal so as to adjust an average current flowing through said load to said target level.

6. The controller as claimed in claim 1, wherein said load comprises a light-emitting diode (LED) light source.

7. The controller as claimed in claim 1, wherein an average level of said square wave signal is proportional to an average level of said current through said load.

8. A circuit for driving a light source, said driving circuit comprising:
    a first switch alternately operating in a first state and a second state according to a driving signal;
    a power converter coupled to said first switch and comprising a primary winding and a secondary winding, wherein said primary winding receives an input voltage, and said secondary winding provides an output voltage to power said light source, wherein a first current flowing through said primary winding increases when said first switch operates in said first state, and wherein a second current flowing through said secondary winding decreases when said first switch operates in said second state; and
    a controller coupled to said power converter and said first switch, and configured to generate a square wave signal and generate said driving signal according to said square wave signal to control said first switch, wherein said square wave signal has a first voltage level proportional to a peak level of said first current when said power converter operates in a predetermined state, otherwise, said square wave signal has a second voltage level, wherein said controller comprises:
    a second switch, comprising a first terminal, a second terminal and a third terminal, wherein said first terminal receives a signal having said first voltage level, said second terminal receives a signal having said second voltage level, and said third terminal generates said square wave signal;

wherein said first terminal is coupled to said third terminal when said power converter operates in said predetermined state, and otherwise said second terminal is coupled to said third terminal.

9. The circuit as claimed in claim 8, wherein said power converter operates in said predetermined state when said second current flowing through said secondary winding decreases.

10. The circuit as claimed in claim 8, wherein said power converter further comprises:
an auxiliary winding configured to detect said second current through said secondary winding and generate a detection signal, wherein said detection signal has a third voltage level when said second current decreases, and wherein said detection signal is switched to a fourth voltage level when said second current decreases to a predetermined level.

11. The circuit as claimed in claim 8, wherein an average level of said square wave signal is proportional to an average level of a current flowing through said light source.

12. The circuit as claimed in claim 8, wherein said controller comprises:
an operational amplifier configured to receive said square wave signal and a reference signal, wherein said reference signal indicates a target level of a current flowing through said light source, and wherein said operational amplifier generates an error signal according to a difference between an average level of said square wave signal and said reference signal; and an output circuit coupled to said amplifier and configured to generate said driving signal according to said error signal.

13. The circuit as claimed in claim 12, wherein said first switch, said controller and said power converter constitute a negative feedback loop, and wherein said negative feedback loop maintains said average level of said square wave signal to be equal to said reference signal to adjust an average current flowing through said light source to said target level.

14. The circuit as claimed in claim 8, wherein an average level of said first current is substantially in phase with said input voltage.

15. A method for controlling a power converter, wherein said method comprises:
receiving a sense signal indicating a current flowing through a power converter, wherein said power converter receives an input voltage and provides an output voltage to power a light source;
receiving a detection signal indicating whether said power converter operates in a predetermined state;
generating a square wave signal according to said sense signal and said detection signal, wherein said square wave signal has a first voltage level proportional to a peak level of said current when said power converter operates in said predetermined state, otherwise said square wave signal has a second voltage level; and generating a driving signal according to said square wave signal to control a current flowing through said light source, wherein the step of generating said square wave signal further comprises:
detecting said peak level of said current through said power converter according to said sense signal;
generating a peak signal having said first voltage level according to said peak level;
transferring said peak signal to a driver that performs the operation of generating said driving signal when said power converter operates in said predetermined state; and
transferring a predetermined signal having said second voltage level to said driver when said power converter operates in a state other than said predetermined state.

16. The method as claimed in claim 15, wherein said power converter comprises a primary winding and a secondary winding, and wherein said primary winding receives said input voltage and said secondary winding generates said output voltage, said method further comprising:
sensing a current flowing through said primary winding to generate said sense signal; and
detecting a status of a current flowing through said secondary winding to generate said detection signal, wherein said power converter operates in said predetermined state when said detection signal indicates that said current through said secondary winding is decreasing.

17. The method as claimed in claim 15, wherein said power converter further comprises an inductor, said method further comprising:
sensing a current flowing through said inductor to generate said sense signal; and
detecting a status of said current flowing through said inductor, to generate said detection signal, wherein said power converter operates in said predetermined state when said detection signal indicates that said current flowing through said inductor is decreasing.

18. The method as claimed in claim 15, wherein the step of generating said driving signal further comprises:
receiving a reference signal indicating a target level of said current flowing through said light source;
generating an error signal according to a difference between an average level of said square wave signal and said reference signal;
receiving a saw-tooth signal; and
comparing said saw-tooth signal and said error signal to generate said driving signal.

19. The method as claimed in claim 18, further comprising:
maintaining said average level of said square wave signal to be equal to said reference signal so as to adjust an average current flowing through said light source to said target level.

20. The method as claimed in claim 15, wherein an average level of said square wave signal is proportional to an average level of said current flowing through said light source.

* * * * *